(12) United States Patent
Fuhrmann et al.

(10) Patent No.: US 6,917,656 B2
(45) Date of Patent: Jul. 12, 2005

(54) COMMUNICATIONS NETWORK HAVING A TIME-CONTROLLED COMMUNICATION PROTOCOL

(75) Inventors: Peter Fuhrmann, Aachen (DE); Wolfgang Budde, Aachen (DE); Robert Mores, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 796 days.

(21) Appl. No.: 09/781,504

(22) Filed: Feb. 12, 2001

(65) Prior Publication Data

US 2002/0052707 A1 May 2, 2002

(30) Foreign Application Priority Data

Feb. 16, 2000 (DE) .......................................... 100 07 070

(51) Int. Cl.[7] ................................................. H04L 7/00
(52) U.S. Cl. ........................ 375/355; 375/354; 375/356
(58) Field of Search ................................ 375/355, 356; 370/516, 517, 518, 519, 503

(56) References Cited

U.S. PATENT DOCUMENTS

| | | | | |
|---|---|---|---|---|
| 4,939,753 A | * | 7/1990 | Olson .......................... | 375/356 |
| 5,790,608 A | * | 8/1998 | Benayoun et al. .......... | 375/356 |
| 6,622,022 B1 | * | 9/2003 | Du .............................. | 455/502 |

2001/0038674 A1 * 11/2001 Trans .......................... 375/355

OTHER PUBLICATIONS

By Dr. Stefan Polenda et al., Entitled: Elecktronik No. 14, 1999, pp. 36 to 43, TTP: "Drive By Wire".
By Hermann Kopetz, Andreas Kruger, Ditmar Millinger, Anton Schedl: Entitled: A Synchronization Strategy for a Time–Triggered Multicluster Real–Time System; Proc. of the 14th IEEE Symposium on Reliable Distributed Systems, Ba Neuenahr, Germany, IEEE Press, Sep. 1995.

* cited by examiner

*Primary Examiner*—Jay Patel
*Assistant Examiner*—Qutub Ghulamali
(74) *Attorney, Agent, or Firm*—Adam L. Stroud

(57) ABSTRACT

The invention relates to a communications network (1) comprising a plurality of network nodes (2), which include each a synchronization circuit (5) for generating a global clock signal (GT) from a local clock signal (LT) formed by a clock generator (4) in dependence on a time of reception of a message. The synchronization circuit (5) includes a divider arrangement (8) for dividing the local clock signal (LT) in dependence on a correction term (KT) and at least one divider factor which is produced by a scaler arrangement (9). The comparator circuit (10) is provided for forming the correction term by comparing the instant of reception of a message and of the local clock signal LT. Furthermore, the synchronizing circuit (5) includes a divider control (7) which may perform a change of at least one divider factor when the correction term (KT) exceeds a predefined first threshold.

2 Claims, 6 Drawing Sheets

US 6,917,656 B2

COMMUNICATIONS NETWORK HAVING A TIME-CONTROLLED COMMUNICATION PROTOCOL

The invention relates to a communications network comprising a plurality of network nodes, which include each
- a synchronization circuit for generating a global clock signal from a local clock signal formed by a clock generator in dependence on a time of reception of a message,
- a divider arrangement included in the synchronization circuit, for dividing the local clock signal in dependence on at least one divider factor produced by a scaler arrangement, and a correction term, and
- a comparator circuit for forming the correction term by comparing the time of reception of a message and of the local clock signal LT.

In such a communications network for the motor industry, for example, the TTP protocol (TTP=Time-Triggered Protocol) known from the periodical "Elektronik" no. 14, 1999, pp. 36 to 43 (Dr. Stefan Polenda, Georg Kroiss: "TTP: "Drive by Wire" in greifbarer Nähe"). This protocol renders a correction term available for performing the synchronization, which term is the result of the comparison of the theoretical time at which a certain message is to be received with the actual time of reception. If this correction term is caused by a crawling, continuous deviation (for example, by altering the clock source), the term is repeatedly to be canceled in each synchronization interval.

It is an object of the invention to provide a communications network having dynamic synchronization.

The object is achieved by a communications network of the type defined in the opening paragraph in that the synchronization circuit includes a divider control, which is provided for changing at least one divider factor when the correction term exceeds a first threshold.

The idea underlying this invention is a synchronization circuit which, by controlling the divider circuit, causes a dynamic configuration of the divider factors to occur when the correction term generated in the comparator circuit exceeds a predefined first threshold. In this manner a continuous deviation of the local clock from the global clock is taken into account by a one-time change of the divider factors, and repeated adjustment for compensating the found deviation of the local clock becomes superfluous.

To effect the change of the divider factors, a correction term is formed. When the correction term exceeds the predefined first threshold, the control unit delivers a control signal to a divider factor generator included in the divider control. Subsequently, the divider factor generator performs a divider adaptation.

If the correction term does not only exceed the first, but also a second threshold, which exceeds the first threshold, a calibration of the divider factors is performed in the calibration unit. This makes it possible to make lasting corrections in large deviations of the local clock as they may occur, for example, after operation intervals of parts of the communications system.

These and other aspects of the invention are apparent from and will be elucidated with reference to the embodiment(s) described hereinafter.

Figure 1:
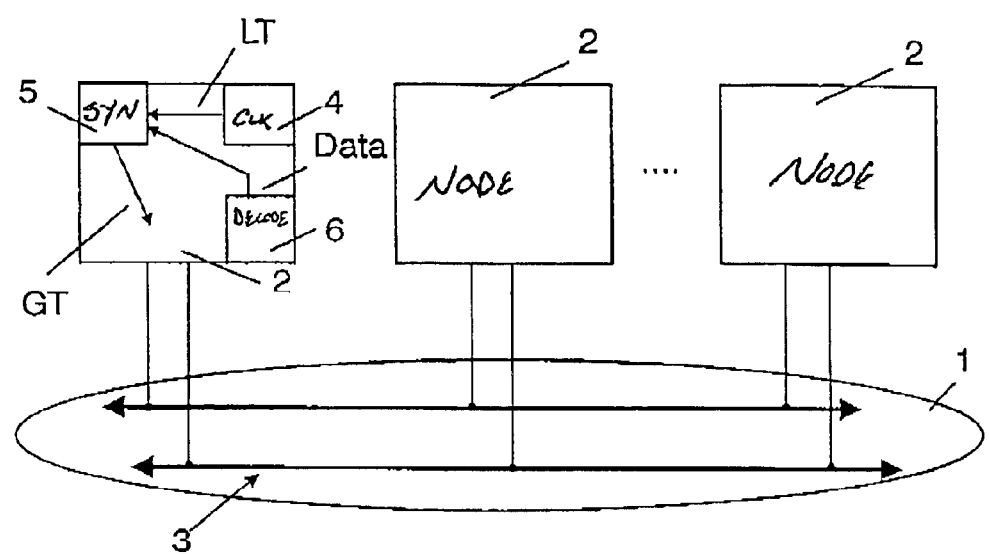
FIG. 1 shows a communications network comprising a plurality of network

An example of embodiment of the communications network 1 is shown in FIG. 1. This communications network 1 may implement the TTP protocol known from the periodical "Elektronik", no. 14, 1999, pp. 36 to 43 (Dr. Stefan Polenda, Georg Kroiss: "TTP: "Drive by Wire" in greifbarer Nähe") and comprises a plurality of network nodes 2 whose access to a common communications medium 3 is controlled by a TDMA method (Time-Division Multiple Access). The method guarantees that always only one network node 2 is allowed to send a message at a predefined time. A time-controlled protocol such as the TTP protocol utilizes in each network node 2 a local clock LT, which is generated in a clock generator 4 of the network node 2. The local clock LT is roughly synchronized with other nodes, with a global clock GT, in a synchronization circuit 5. For the synchronization a decoder 6 delivers to the clock generator 4 of the synchronization circuit 5 the data from the communication medium 3, which data are intended for the node.

Figure 2:
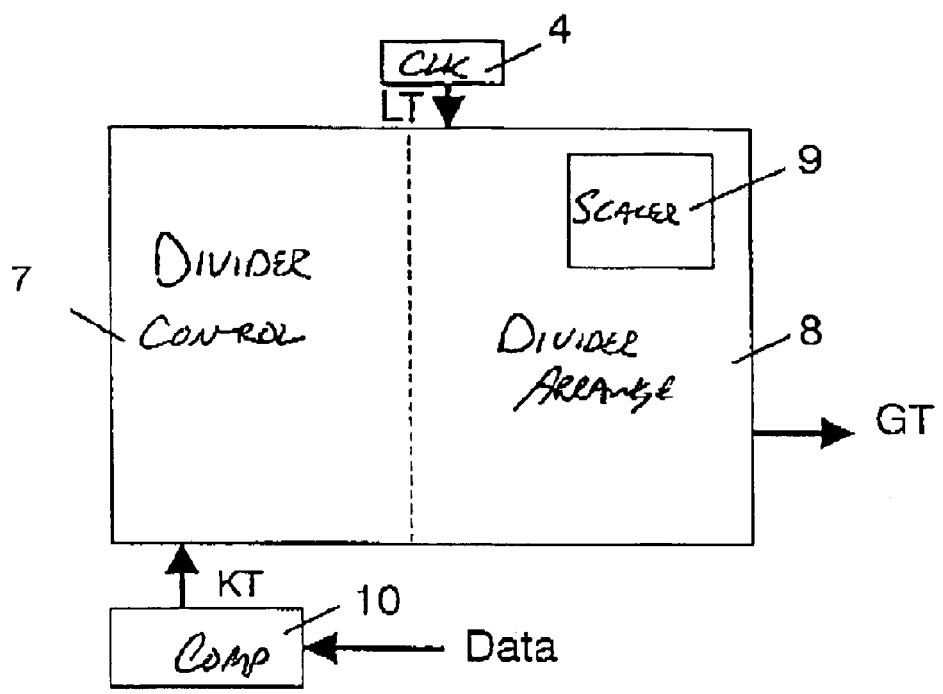
FIG. 2 shows a synchronization circuit of a network node.

The synchronization circuit 5 is described in more detail in FIG. 2. It receives the local clock LT and a correction term KT for modifying the local clock signal LT in a divider control 7 and a divider arrangement 8 with a scaler arrangement 9, and thus for delaying or advancing the next pulse for the global clock GT. The correction term KT arises in a comparator circuit 10 and is the result of the comparison of the theoretical time at which a certain message (data) is to be received, with the actual time of reception of this message (data) (compare periodical "Elektronik", no. 14, 1999, pp. 36 to 43, Dr. Stefan Polenda, Georg Kroiss: "TTP: "Drive by wire" in greifbarer Nähe").

Figure 3:
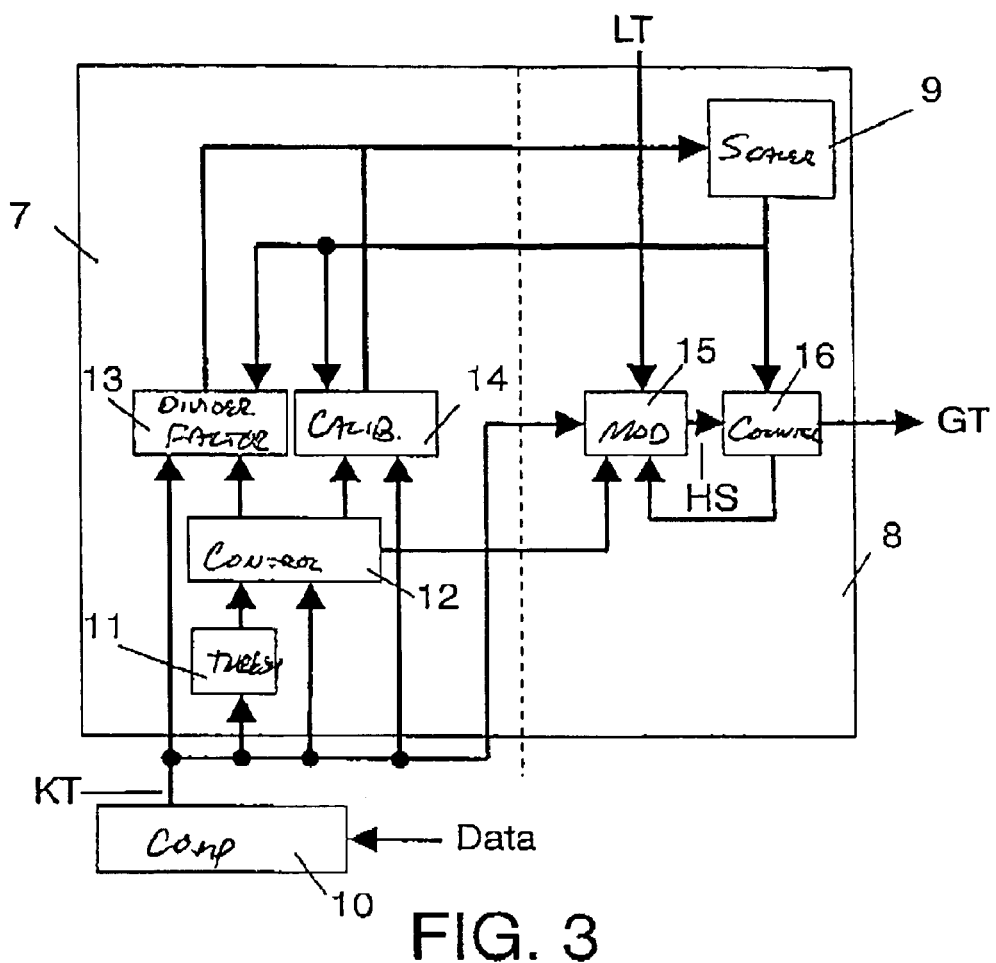
FIG. 3 shows a divider arrangement and a divider control of a synchronization circuit.

FIG. 3 shows an example of embodiment of the divider control 7 and of the divider arrangement 8. The divider control 7 includes a threshold forming circuit 11, whose input is connected to the comparator circuit 10 and whose output is connected to a control unit 12. The control unit 12 can send control signals to a divider factor generator 13, a calibration unit 14 or a modification device 15. The comparator circuit supplies the correction term KT to the divider factor generator 13 and the scaler arrangement 9 supplies two divider factors to the calibration unit 14. Both the divider factor generator 13 and the calibration unit 14 can send data to the scaler arrangement 9. This scaler arrangement 9 together with the modification device 15 and a counter arrangement 16 is included in the divider arrangement 8 and sends the current divider factors to the counter arrangement 16, which renders not only the global clock GT available, but also a modification control signal to the modification device 15. This device 15 has a connection to the comparator circuit 10 and to the clock generator 4 of the network node. The output of the modification device 15 leads to the counter arrangement 16.

In synchronization intervals the deviation of the local clock signal LT from the global clock signal GT is established in the comparator circuit 10 based on the correction term KT. If the correction term KT falls short of a predefined first threshold in the circuit for threshold generation 11, the control unit 12 sends a control signal to the modification device 15. In the modification device 15 the local clock LT is modified in dependence on the correction term KT. An auxiliary signal HS produced by the modification device 15 is divided down by a counter arrangement 16. If the found correction term KT exceeds the predefined first threshold, the control unit 12 sends a control signal to a divider factor generator 13 which causes the divider factors in a scaler arrangement 9 to change in dependence on the correction term KT. If this correction term also exceeds a second threshold, which is larger than the first one, the control unit 12 sends a control signal to the calibration unit 14. The calibration unit 14 determines new values of the divider factors for the scaler arrangement 9 in dependence on the correction term KT.

Figure 4:
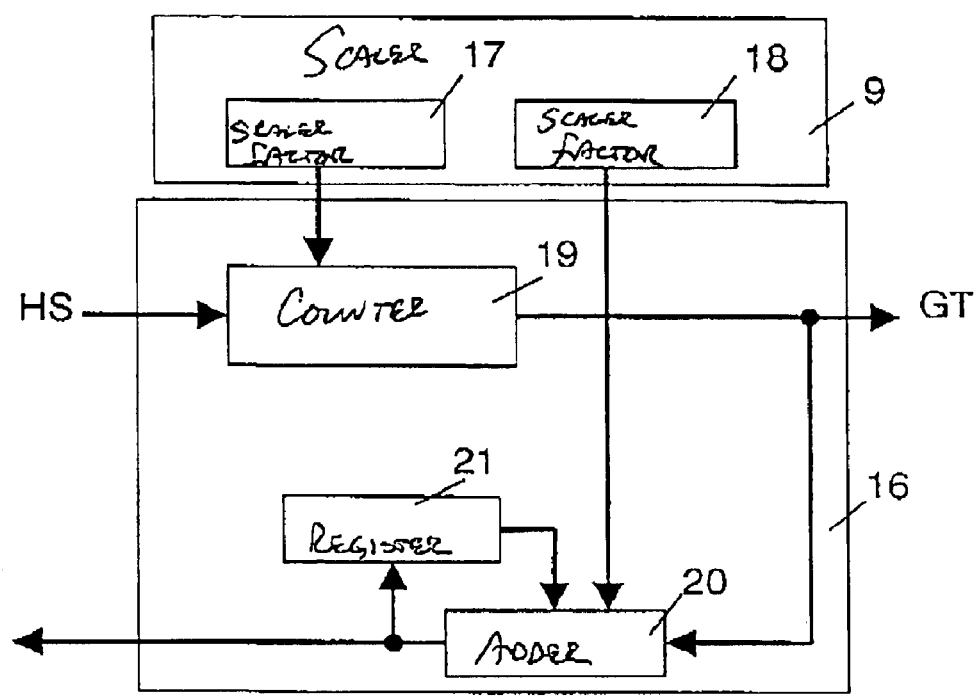
FIG. 4 shows a scaler arrangement and a counter arrangement of a divider arrangement and FIGS. 5 to 7 show signals having the clock occurring in the communications system.

To prescribe no limitation as regards the fundamental frequency for the local clock generator, the scaler arrangement 9 shown in FIG. 4 has an integral scaler factor 17 and, additionally, a non-integral scaler factor 18. A method of maintaining non-integral scaler factors is known from the publication "A Synchronization Strategy for a Time-Triggered Multicluster Real-Time System" (Hermann Kopetz, Andreas Krüger, Ditmar Millinger, Anton Schedl; Proc. of the 14$^{th}$ IEEE Symposium on Reliable Distributed Systems, Bad Neuenahr, Germany, IEEE Press. September 1995). A counter 19, an adder 20 and an accumulator register 21 form the counter arrangement 16. The output of the integral scaler factor 17 leads to the counter 19 and the output of the non-integral scaler factor 18 to the adder 20. The adder 20 sends its data not only to the modification device 15, but also to an accumulator register 21 which in its turn sends its result to the adder 20. Together the adder 20 and the accumulator register 21 form an accumulator. In the counter arrangement 16 the counter 19 is initialized with the value of the integral scaler factor. This counter 19 reduces its contents when it receives a pulse of the auxiliary signal HS from the modification device 15. When the counter has reached the zero value, it generates the global clock GT. Simultaneously, the non-integral scaler is summed by the adder 20 in the accumulator register 21, until its sum reaches the overflow value (value 1). At that moment the adder 20 signalizes to the modification device 15 to suppress a pulse of the local clock LT. In this manner the timing of the counter 19 and thus also of the global clock GT is delayed.

Figure 5:
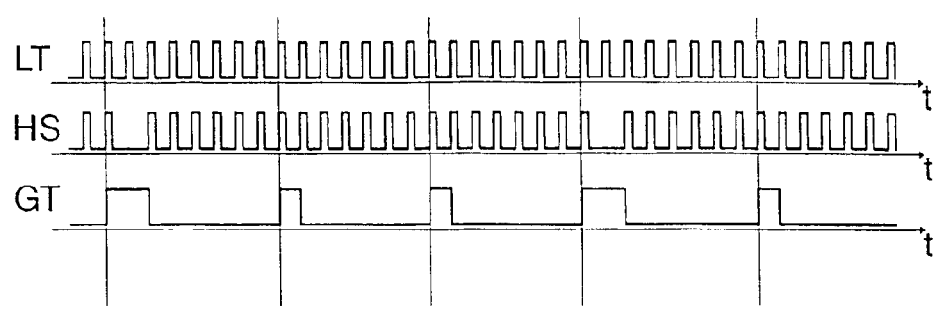
Figure 6:
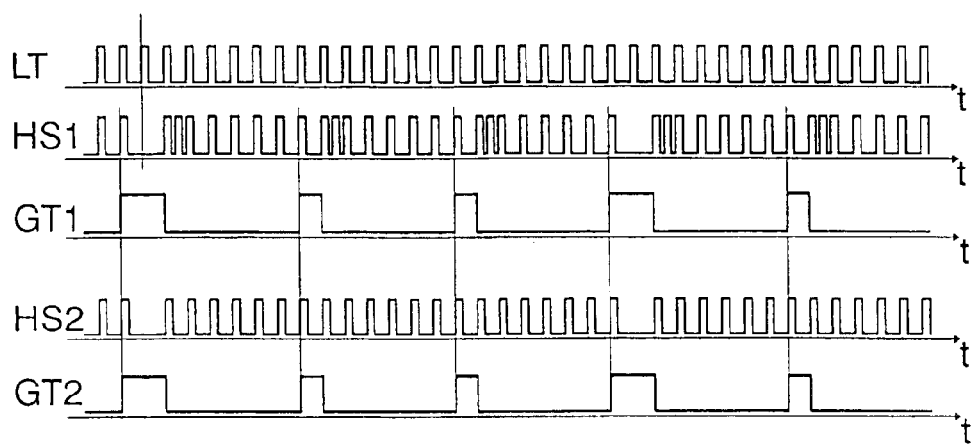
Figure 7:
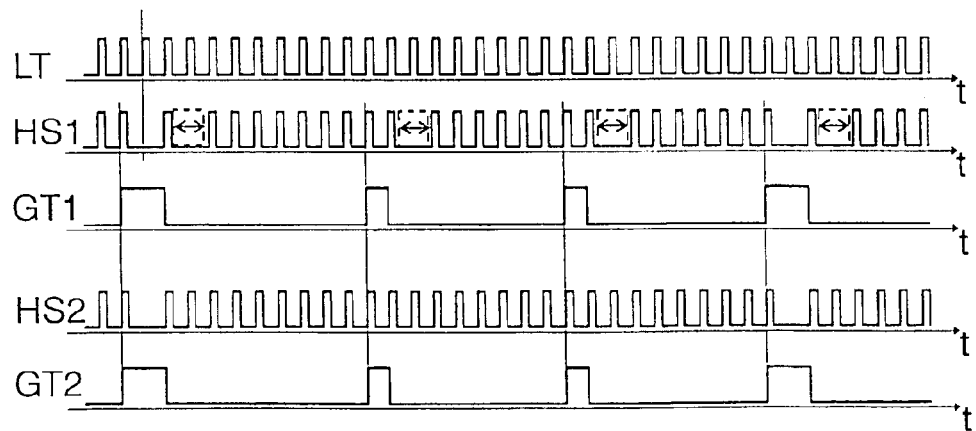

FIG. 5 shows the local clock LT, the modified auxiliary signal HS and the global clock GT. This representation clarifies the dependence between the global clock GT and the local clock LT of a network node. The influence of the divider factors is shown here with reference to an example of configuration. The integral scaler is selected to be 8, while the non-integral scaler is set to ⅓. Every third period of a global clock is lengthened by a clock period of a local clock. For this purpose, a pulse is extracted from the local clock at the respective time. The modified auxiliary signal HS is used as a counter clock to generate the global clock GT. FIGS. 6 and 7 show by way of example for a given local clock LT the respective global clock signal GT1 generated in synchronism with auxiliary signal HS1 as is customary, and the global clock signal GT2 generated with the aid of the dynamic configuration of the divider factors in synchronism with auxiliary signal HS2. FIG. 6 describes the case of the clock acceleration, whereas FIG. 7 shows a case of the clock delay. One clearly recognizes in both cases the identity of the global clocks GT1 and GT2, while the auxiliary signals represent, on the one hand, the correction in accordance with conventional methods (HS1) and the dynamic divider factor correction (HS2) in accordance with the invention, on the other. The operation will be further explained with the aid of the example of the clock acceleration: Whereas the signal HS1 has in each global clock GT1 an additional pulse to generate the eight pulses in a shorter time space, as a result of the changed divider factors, for HS2 seven pulses suffice to show the beginning of a new global clock period.

What is claimed is:

1. A communications network comprising:
   a plurality of network nodes, each node including a synchronization circuit for generating a global clock signal from a local clock signal (LT) formed by a clock generator in dependence on a time of reception of a message;
   a divider arrangement included in the synchronization circuit, for dividing the local clock signal in dependence on at least one divider factor produced by a scaler arrangement, and a correction term (KT), and
   a comparator circuit for forming the correction term by comparing the time of reception of a message and of the local clock signal LT
   wherein the synchronization circuit further comprises a divider control, which is provided for changing at least one divider factor when the correction term (KT) exceeds a predefined first threshold and wherein the divider control includes a control unit which is provided for applying a control signal to a divider factor generator, for changing the divider factors when the control signal occurs included in the divider control when the correction term exceeds the predefined first threshold.

2. A communications network as claimed in claim 1, wherein the synchronization circuit includes a calibration unit which is provided for calibrating the divider factors when the correction term (KT) exceeds a predefined second threshold which is larger than the first threshold.

* * * * *